(12) United States Patent
Muto et al.

(10) Patent No.: US 8,517,198 B2
(45) Date of Patent: Aug. 27, 2013

(54) VEHICULAR FUEL TANK FUEL FILLER ORIFICE DEVICE

(75) Inventors: Yusuke Muto, Wako (JP); Yasufumi Yokura, Wako (JP); Shiro Kokubu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 478 days.

(21) Appl. No.: 12/682,017

(22) PCT Filed: Oct. 16, 2008

(86) PCT No.: PCT/JP2008/068715
§ 371 (c)(1),
(2), (4) Date: Jul. 6, 2010

(87) PCT Pub. No.: WO2009/054305
PCT Pub. Date: Apr. 30, 2009

(65) Prior Publication Data
US 2010/0288763 A1 Nov. 18, 2010

(30) Foreign Application Priority Data
Oct. 23, 2007 (JP) .................................. 2007-275468

(51) Int. Cl.
*B65D 47/02* (2006.01)

(52) U.S. Cl.
USPC ........ 220/86.2; 220/88.2; 220/86.3; 220/86.1

(58) Field of Classification Search
USPC ................. 220/88.2, 86.3, DIG. 32, DIG. 33, 220/86.1, 86.4, 562, 86; 55/521, 525
See application file for complete search history.

(56) References Cited

U.S. PATENT DOCUMENTS

| 1,283,384 | A | * | 10/1918 | Weil | 222/80 |
| 1,747,424 | A | * | 2/1930 | Casey | 220/86.1 |
| 1,995,997 | A | * | 3/1935 | Morris | 220/86.1 |
| 2,066,830 | A | * | 1/1937 | Fenton | 220/86.3 |
| 5,312,545 | A | * | 5/1994 | Starin et al. | 210/172.6 |

FOREIGN PATENT DOCUMENTS

| JP | 54-35413 | 3/1979 |
| JP | 57-142635 | 9/1982 |
| JP | 57-178932 A | 11/1982 |
| JP | 58-86726 U | 6/1983 |
| JP | 3-128519 U | 12/1991 |
| JP | 63-98828 U | 6/1998 |
| JP | 2000-220545 A | 8/2000 |
| JP | 2001-138755 A | 5/2001 |
| JP | 2003-301751 A | 10/2003 |

* cited by examiner

*Primary Examiner* — Jeffrey Allen
(74) *Attorney, Agent, or Firm* — Birch, Stewart, Kolasch & Birch, LLP

(57) ABSTRACT

A vehicular fuel tank fuel filler orifice device that is provided with a fuel filler orifice in an upper wall of a vehicular fuel tank that stores ethanol fuel for an engine and a fuel filler guide tube extending from the fuel filler orifice to the interior of the fuel tank. A flame arrestor made of a metal mesh with a larger diameter than that of the fuel filler guide tube is mounted on the fuel filler guide tube. The flame arrestor covers a lower opening of the fuel filler guide tube for allowing a flow of the fuel but preventing the entrance of a flame. Using a flame arrestor, not only prevents a flame from entering a fuel tank from a fuel filler orifice but also smoothly carries out an exchange of fuel and air in the flame arrestor when filling with fuel, thus speeding the filling with fuel.

14 Claims, 13 Drawing Sheets

VEHICULAR FUEL TANK FUEL FILLER ORIFICE DEVICE

TECHNICAL FIELD

The present invention relates to an improvement of a vehicular fuel tank fuel filler orifice device that is provided with a fuel filler orifice in an upper wall of a vehicular fuel tank that stores ethanol fuel as fuel for an engine and with a fuel filler guide tube extending from the fuel filler orifice to the interior of the fuel tank.

BACKGROUND ART

In recent years, research and development of vehicles using ethanol as fuel have been actively carried out. Within a fuel tank storing ethanol fuel, in a case in which the ethanol concentration is substantially 100%, the air/fuel ratio at normal temperature is often in a combustible range, and for a vehicle equipped with this fuel tank, even in the event that a flame comes close to a fuel filler orifice of the fuel tank for some reason, it is desirable that the flame is prevented from entering the fuel tank.

In an automobile, a fuel filler guide tube extending upward from a fuel tank is generally equipped with a device such as a shutter that is normally retained in a closed state and is opened when a fuel filler gun is inserted into the fuel filler guide tube (see Patent Publication 1), and there is therefore no possibility that a flame will enter the fuel tank. However, in a motorcycle such as a motorbike, in terms of layout of a fuel tank, it is not realistic to mount a long fuel filler guide tube on the fuel tank, and it is therefore difficult in practice to provide a shutter, etc. as for an automobile.

Providing a flame arrestor made of a metal mesh within a narrow fuel filler guide tube to prevent a flame from entering the fuel tank can be considered, but in this case consideration must be given to degradation of the fuel filling performance since an oil film is formed in many of the mesh holes of the flame arrestor due to the surface tension of the fuel when it comes into contact with the whole of the flame arrestor when filling with fuel, as a result of which the replacement of air discharged from the fuel tank to the fuel filler guide tube side with fuel flowing from the fuel filler guide tube to the fuel tank side is inhibited in the flame arrestor.

Patent Document 1: Japanese Patent Application Laid-open No. 2001-138755

DISCLOSURE OF INVENTION

Problems to be Solved by the Invention

The present invention has been accomplished in light of such circumstances, and it is an object thereof to provide a vehicular fuel tank fuel filler orifice device that, using a flame arrestor, not only prevents a flame from entering a fuel tank from a fuel filler orifice but also, when filling with fuel, enables the exchange of fuel and air in the flame arrestor to be carried out smoothly, thus speeding the filling with fuel.

Means for Solving the Problems

In order to attain the above object, according to a first aspect of the present invention, there is provided a vehicular fuel tank fuel filler orifice device that is provided with a fuel filler orifice in an upper wall of a vehicular fuel tank that stores ethanol fuel as fuel for an engine and a fuel filler guide tube extending from the fuel filler orifice to the interior of the fuel tank, characterized in that mounted on the fuel filler guide tube is a flame arrestor that is made of a metal mesh and has a larger diameter than that of the fuel filler guide tube, the flame arrestor covering a lower opening of the fuel filler guide tube and allowing flow of the fuel but preventing the entrance of flame.

According to a second aspect of the present invention, in addition to the first aspect, an annular mounting plate is provided so as to be connected to the lower end of the fuel filler guide tube, the mounting plate having a larger diameter than that of the fuel filler guide tube, and an outer peripheral end part of the flame arrestor is mounted on an outer peripheral end part of the mounting plate, the flame arrestor having a bowl shape with an open upper face.

According to a third aspect of the present invention, in addition to the second aspect, the flame arrestor is formed into a bowl shape having a depth that is smaller than a diameter thereof.

According to a fourth aspect of the present invention, in addition to the second aspect, a gun stopper preventing abutment of a fuel filler gun inserted into the fuel filler guide tube against the flame arrestor is provided on the mounting plate.

Effects of the Invention

In accordance with the first aspect of the present invention, even in the event that, in a state in which a tank cap is removed, a flame such as a spark enters the fuel filler guide tube, an effect of the flame arrestor, which covers the fuel filler guide tube from below, in preventing the flame from passing through can be expected, it is therefore possible to use a relatively short fuel filler guide tube, and application of the present invention to a small fuel tank such as one mounted in a motorcycle becomes easy. Moreover, since the flame arrestor has a larger diameter than that of the fuel filler guide tube, the flow path area for a fluid is large, and when filling with fuel, there are many mesh hole portions in the flame arrestor where no oil film of fuel is formed, and it is therefore possible to carry out smooth replacement of air discharging from the fuel tank to the fuel filler guide tube side with fuel flowing from the fuel filler guide tube to the fuel tank side, thus ensuring adequate fuel filling performance.

In accordance with the second aspect of the present invention, since the flame arrestor having a larger diameter than that of the fuel filler guide tube forms a bowl shape with an open upper face, it is possible to give the flame arrestor a wide flow path area for a fluid effectively. Therefore, application to a small fuel tank becomes possible while employing a flame arrestor with a wide flow path area.

In accordance with the third aspect of the present invention, since the flame arrestor is formed into a bowl shape having a smaller depth than its diameter, the amount of flame arrestor projecting below the fuel filler guide tube can be minimized.

In accordance with the fourth aspect of the present invention, when filling with fuel, it is possible to prevent by means of the gun stopper a fuel filler gun inserted into the fuel filler guide tube from abutting against the flame arrestor, thus preventing any damage to the flame arrestor. Moreover, in the same manner as for the flame arrestor, the gun stopper can easily be mounted on a mounting plate without interference from the fuel filler guide tube.

EXPLANATION OF REFERENCE NUMERALS AND SYMBOLS

Figure 1:
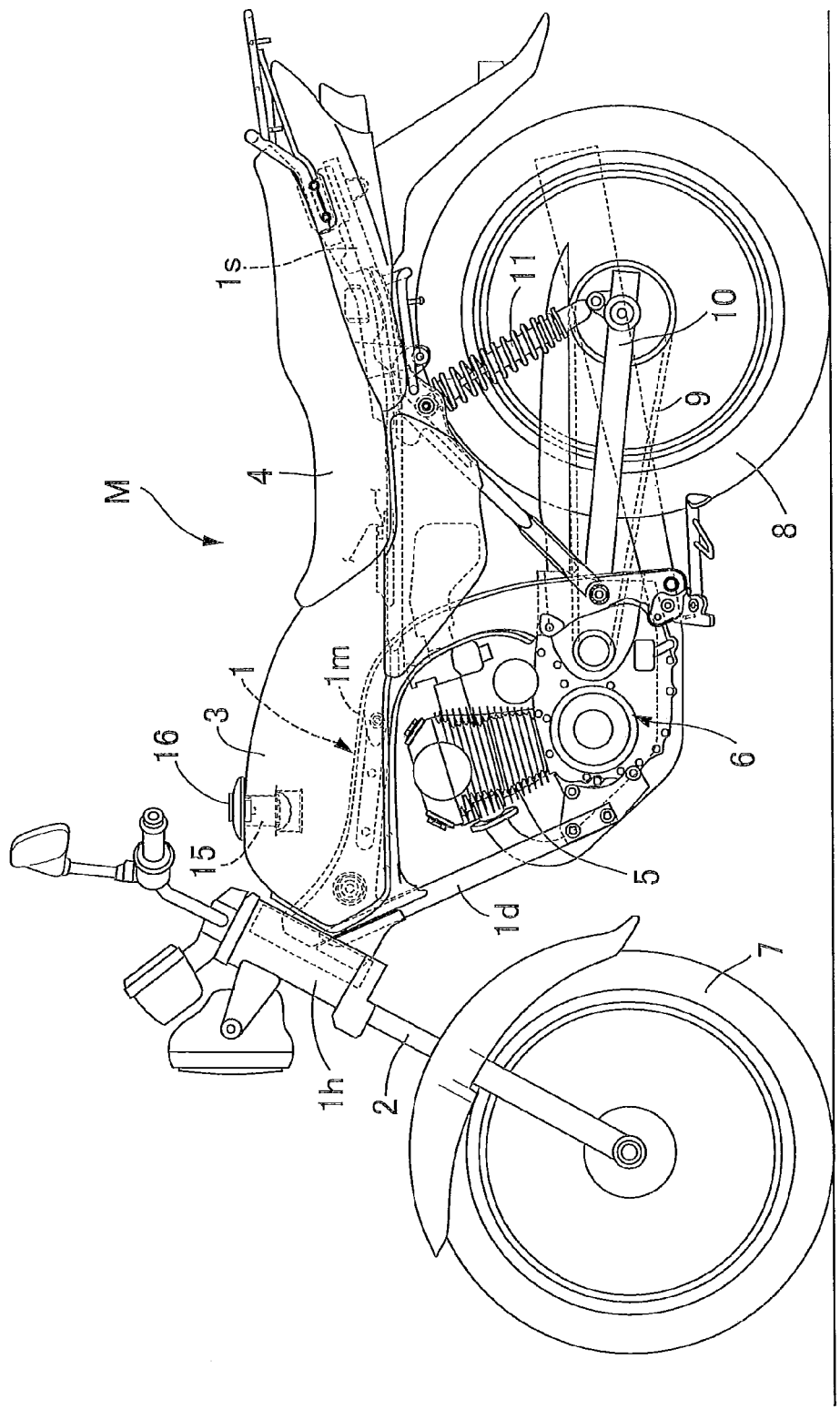
FIG. 1 is a side view of a motorcycle equipped with a fuel tank that includes a fuel filler orifice device related to a first embodiment of the present invention. (first embodiment)

3 Fuel tank for storing ethanol fuel
3a Upper wall
15 Fuel filler guide tube
15a Fuel filler orifice
18 Mounting plate
20 Gun stopper
21 Flame arrestor

BEST MODE FOR CARRYING OUT THE INVENTION

Modes for carrying out the present invention are explained below by reference to preferred embodiments shown in the attached drawings.

Embodiment 1

A first embodiment of the present invention shown in FIG. 1 to FIG. 4 is now explained.

In FIG. 1, a vehicle body frame 1 of a motorcycle M is formed from a head pipe 1h steerably supporting a front fork 2, a main frame 1m extending substantially horizontally rearward from the head pipe 1h and then bending downward, a seat rail 1s extending substantially horizontally rearward from the rear end of the horizontal portion of the main frame 1m, and a down tube 1d extending obliquely downward from the head pipe 1h; a fuel tank 3 and a seat 4 disposed so as to be connected to the rear of the fuel tank 3 are mounted on the main frame 1m and the seat rail 1s respectively, and a power unit 6 containing an engine 5 disposed immediately below to the fuel tank 3 is mounted between the down tube 1d and the downwardly bent portion of the main frame 1m. A front wheel 7 is axially supported at the lower end of the front fork 2, a rear wheel 8 driven by the power unit 6 via a chain 9 is axially supported at the rear end of a rear fork 10 vertically swingably supported on a lower end part of the main frame 1m, and a rear cushion 11 is disposed between the rear fork 10 and the seal rail 1s.

Figure 2:
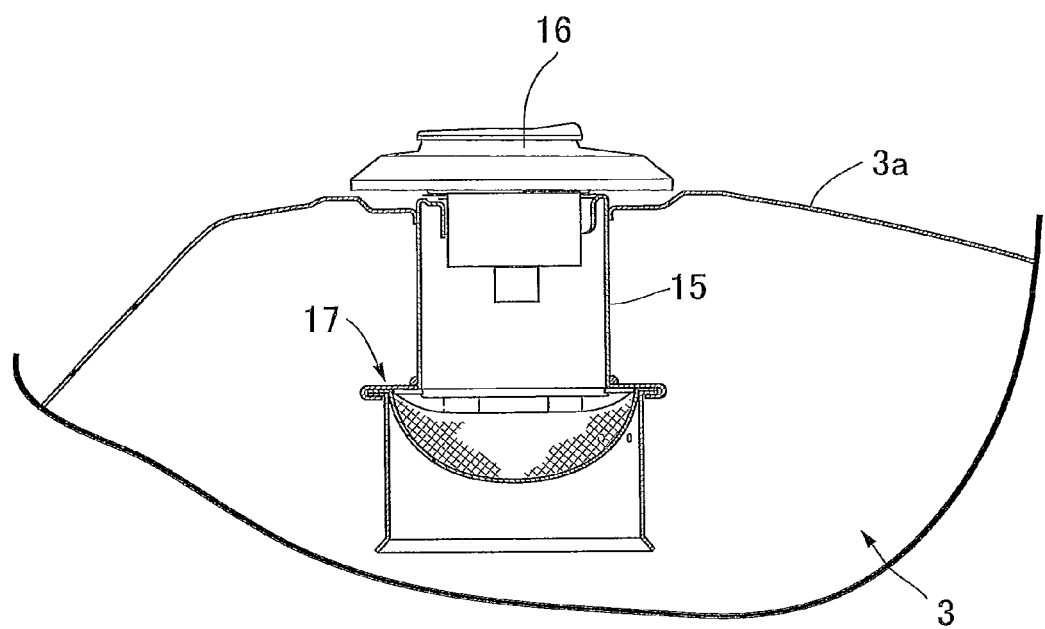
FIG. 2 is a sectional side view of the fuel tank fuel filler orifice device part of FIG. 1. (first embodiment)
Figure 3:
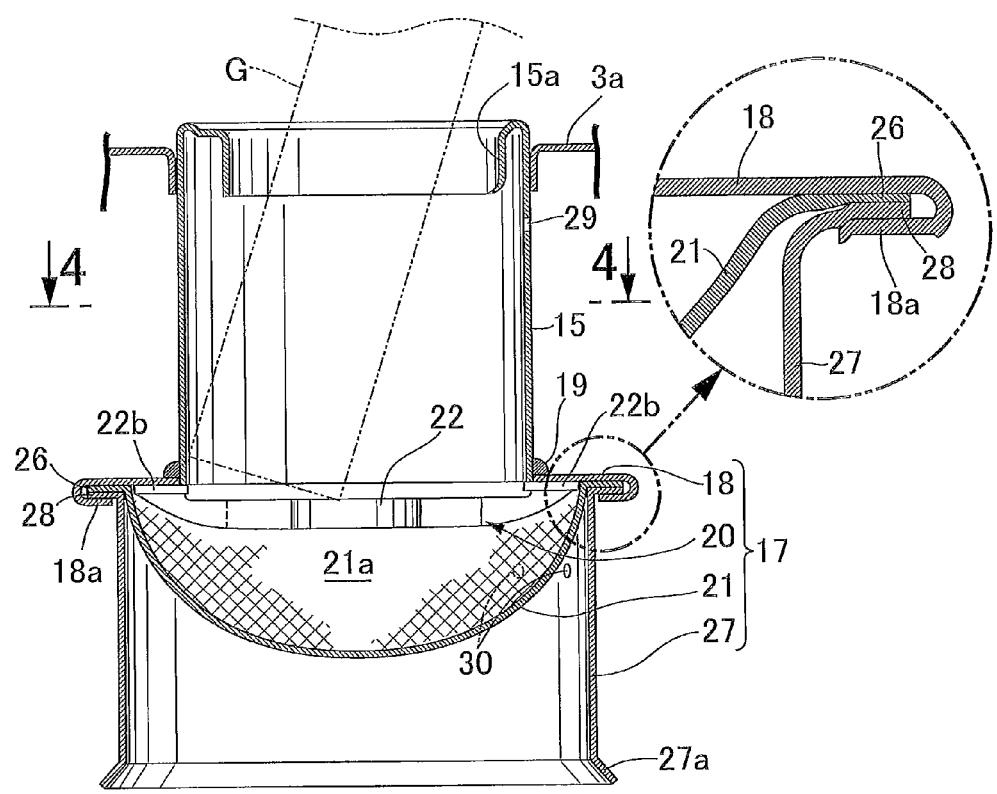
FIG. 3 is an enlarged view of an essential part of FIG. 2. (first embodiment)

As shown in FIG. 2 and FIG. 3, the fuel tank 3 stores ethanol fuel as fuel for the engine, and a fuel filler guide tube 15 is liquid-tightly welded to its upper wall 3a so as to extend therethrough. An upper end part, projecting from an upper face of the fuel tank 3, of the fuel filler guide tube 15 is bent through 180° into the interior of the fuel filler guide tube 15 along the entire periphery thereof to thus form a fuel filler orifice 15a. This fuel filler orifice 15a is normally closed by a tank cap 16, and when filling with fuel, as shown in FIG. 3, insertion of a fuel filler gun G into the fuel filler guide tube 15 is allowed by removing the tank cap 16.

The majority of the fuel filler guide tube 15 projects into the fuel tank 3, and a flame arrestor assembly 17 is mounted on the peripheral edge of a lower end part of the fuel filler guide tube 15.

This flame arrestor assembly 17 is formed from an annular mounting plate 18 that is mounted on the peripheral edge of the lower end part of the fuel filler guide tube 15 via a weld 19 after producing the assembly 17, a gun stopper 20 welded to a lower face of the mounting plate 18 and disposed so as to traverse a lower opening of the fuel filler guide tube 15, a flame arrestor 21 joined to the lower face of the mounting plate 18 radially outward of the gun stopper 20 and covering the opening at the lower end of the fuel filler guide tube 15 while housing the gun stopper 20, and a cylindrical skirt 27 housing the flame arrestor 21 and extend downward therefrom.

Figure 4:
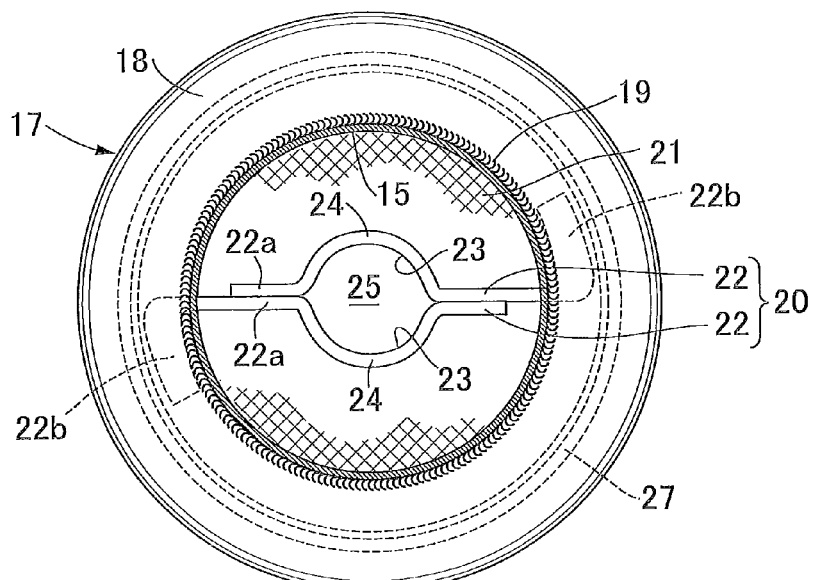
FIG. 4 is a sectional view along line 4-4 in FIG. 3. (first embodiment)

More particularly, as shown in FIG. 3 and FIG. 4, the flame arrestor 21 is formed from two band plate members 22 and 22; these band plate members 22 and 22 are disposed so that a main portion 22a traversing the lower opening of the fuel filler guide tube 15 has its plate face along the axial direction of the fuel filler guide tube 15, are superimposed on each other, and welded. Support pieces 22b and 22b, which are superimposed on the lower face of the mounting plate 18, are formed at one end of one of the band plate members 22 and the other end of the other band plate member 22, and these support pieces 22b and 22b are each welded to the lower face of the mounting plate 18. Projections 24 and 24 are bendingly formed on portions, positioned on the axis of the fuel filler guide tube 15, of the band plate members 22 and 22, the projections 24 and 24 projecting outwardly from each other and having recesses 23 and 23 on the inside, and these projections 24 and 24 are disposed so that the two recesses 23 and 23 on the inside oppose each other to form one passage 25. By so doing, the band plate members 22 and 22 become interchangeable with each other, and may be formed from identical components. The projection 24 is formed in a semicircular shape in the illustrated example, but may be formed in another shape such as a V-shape or an angular U shape.

The flame arrestor 21 allows fuel to pass through but prevents the passage of a flame, and is made of a zinc-plated metal mesh in the illustrated example; individual wires have a diameter of 0.28 mm, and the number of meshes per square inch is 16. This flame arrestor 21 is in a bowl shape with an open upper face in order to define a hollow portion 21a housing the gun stopper 20, and a radially outward flange 26 is formed at the upper end of the flame arrestor 21. In the case of the illustrated example, the bowl shape of the flame arrestor 21 is formed from part of a sphere. The skirt 27 is in a cylindrical shape housing the flame arrestor 21 and extending downward therefrom, a flange 28 is also formed at the upper end thereof, and a funnel portion 27a having its diameter increasing as it goes downward is formed at the lower end of the skirt 27.

The flame arrestor assembly 17 is formed by superimposing the flange 26 and the flange 28 on each other, superimposing them on the lower face of the mounting plate 18, and then sandwiching the flanges 26 and 28 between this mounting plate 18 and a swaging part 18a formed by bending an outer peripheral part of the mounting plate 18 downward and radially inward. After forming this flame arrestor assembly 17, the mounting plate 18 is welded to the lower end part of the fuel filler guide tube 15.

As shown in FIG. 3, a first vent 29 is provided in an upper part of a peripheral wall of the fuel filler guide tube 15, the first vent 29 providing communication between the interior and exterior of the fuel filler guide tube 15, and a second vent 30 is also provided in an upper part of a peripheral wall of the skirt 27, the second vent 30 providing communication between the interior and exterior of the skirt 27. In this arrangement, the second vent 30 is either formed so as to have a larger diameter than that of the first vent 29 or so that the number thereof is larger than that of the first vent 29.

The operation of the first embodiment is now explained.

In a state in which the tank cap 16 is removed, even in the event that a flame such as a spark enters the fuel filler guide tube 15, an effect of the flame arrestor 21 in preventing the flame from passing through can be expected.

Moreover, since the skirt 27 is provided so as to be connected to the lower end of the fuel filler guide tube 15, the skirt 27 extending below the flame arrestor 21 while surrounding the flame arrestor 21 along the entire periphery, it is possible by means of the skirt 27 to prevent air convection between the interior of the fuel filler guide tube 15 and an upper part of the interior of the fuel tank 3 occurring via of the flame arrestor 21.

In order to achieve more effective prevention of convection by the skirt 27, providing the funnel portion 27a, which increases in diameter as it goes downward, in the lower end part of the skirt 27, or setting the axial length of the skirt 27 so as to be substantially twice or more the axial length of the flame arrestor 21 is effective.

On the other hand, when filling the fuel tank 3 with fuel, even if the fuel filler gun G is carelessly inserted into the fuel filler guide tube 15 via the fuel filler orifice 15a, since the extremity of the fuel filler gun G abuts against the gun stopper 20 disposed above the flame arrestor 21, it is possible to prevent the fuel filler gun G from contacting the flame arrestor 21. In this way, since the depth of insertion of the fuel filler gun G into the fuel filler guide tube 15 is restricted to a fixed level by the gun stopper 20, it is possible to protect the flame arrestor 21 while enable the use of a relatively short fuel filler guide tube 15.

Furthermore, since the flame arrestor 21 is in the bowl shape that has a larger diameter than that of the fuel filler guide tube 15, it is possible to ensure a wide fluid flow area, and when filling with fuel, replacement of air discharged from the fuel tank 3 to the fuel filler guide tube 15 side with fuel flowing into the fuel tank 3 side from the fuel filler guide tube 15 is smoothly carried out in the flame arrestor 21, thus speeding the filling with fuel.

Moreover, since the flame arrestor 21, which is in the bowl shape with the open upper face, has the hollow portion 21a extending downward from the lower end of the fuel filler guide tube 15, and the gun stopper 20 is disposed in the hollow portion 21a, the space efficiency is improved, and the gun stopper 20 and the flame arrestor 21 can be mounted on the lower end part of the fuel filler guide tube 15 compactly. Furthermore, since the gun stopper 20 within the hollow portion 21a occupies the position beneath the fuel filler guide tube 15, it is possible to suppress any reduction in the flow path area of the fuel filler guide tube 15 due to the gun stopper 20, and decrease the overall fuel flow resistance, thus speeding filling with fuel.

Furthermore, since the gun stopper 20 is formed from the band plate member 22, which is disposed so that its plate face follows the axial direction of the fuel filler guide tube 15, it is possible to give the gun stopper 20 a high strength against an abutment impact force from the fuel filler gun G without interfering with the flow of fuel around the gun stopper 20.

In this arrangement, particularly since the gun stopper 20 is formed from the two band plate members 22 and 22 having their plate faces parallel to each other, and the projection 24 is formed by bending the band plate members 22 so that they project in opposite directions from each other with the recesses 23 on the inside, it is possible to increase the strength of the gun stopper 20, ensure a wide abutment region for the gun stopper 20 against the fuel filler gun G, and enhance the function of the gun stopper 20.

Furthermore, since the two band plate members 22 and 22 forming the gun stopper 20 are disposed so that their plate faces are joined together and the recesses 23 and 23 oppose each other, it is possible to increase the strength of the gun stopper 20 effectively by joining the two band plate members 22 and 22, and since the mutually opposing recesses 23 and 23 form a fuel flow path, the passage of fuel can be promoted. By joining the two band plate members 22 and 22, it is only necessary to form one of the pair of support pieces 22b and 22b for mounting the gun stopper 20 on the mounting plate 18 on each of the mutually opposite end parts of the two band plate members 22 and 22, thus simplifying the mounting structure of the gun stopper 20.

Since the first vent 29 and the second vent 30 are provided in the upper part of the peripheral wall of the fuel filler guide tube 15 and the upper part of the peripheral wall of the skirt 27 respectively, and the second vent 30 is formed so as to have a larger diameter than that of the first vent 29 or so that the number thereof is larger than that of the first vent 29, when the fuel level within the fuel tank 3 increases above the level of the lower end face of the skirt 27 accompanying filling of the fuel tank 3 with fuel, air in an upper part within the fuel tank 3 flows smoothly outward via the first and second vents 29 and 30, thereby preventing any decrease in the speed at which the fuel tank 3 is filled with fuel. Furthermore, when the fuel level within the fuel tank 3 increases beyond the level of the second vent 30, outflow of air in the upper part within the fuel tank 3 to the outside is throttled by the first vent 29, the fuel level within the fuel filler guide tube 15 increases rapidly accompanying filling with fuel, and a fuel-filling operator realizes that the fuel tank 3 is full on seeing this state and stops the fuel-filling operation. Subsequently, air in the upper part within the fuel tank 3 gradually flows to the outside via the first vent 29, and the fuel level within the fuel filler guide tube 15 slowly decreases and reaches the same level as the fuel level within fuel tank 3. It is thus possible to prevent excessive filling of the fuel tank 3 with fuel.

In such a vehicular fuel tank fuel filler orifice device, since the flame arrestor assembly 17 is formed by welding the gun stopper 20 to the mounting plate 18 and swaging the flame arrestor 21 and the skirt 27, and the mounting plate 18 is joined by welding to the lower end part of the fuel filler guide tube 15, it is possible to produce the flame arrestor assembly 17 easily without interference from the fuel filler guide tube 15, thus contributing to an improvement in productivity.

Embodiment 2

Figure 5:
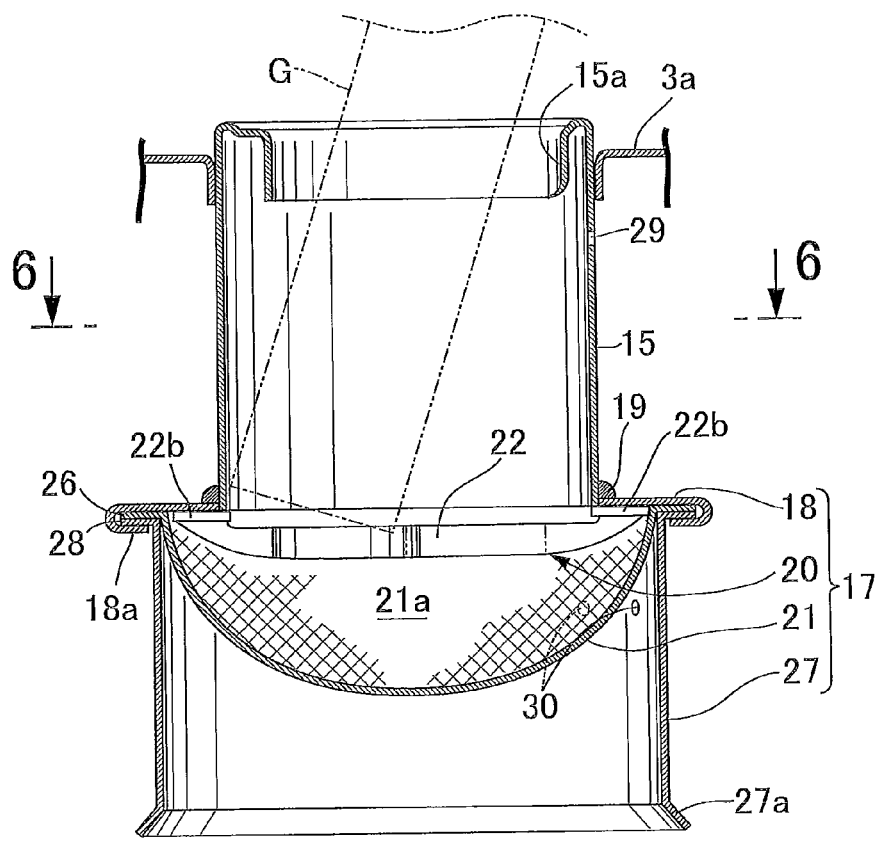
FIG. 5 is a view, corresponding to FIG. 3, showing a second embodiment of the present invention. (second embodiment)
Figure 6:
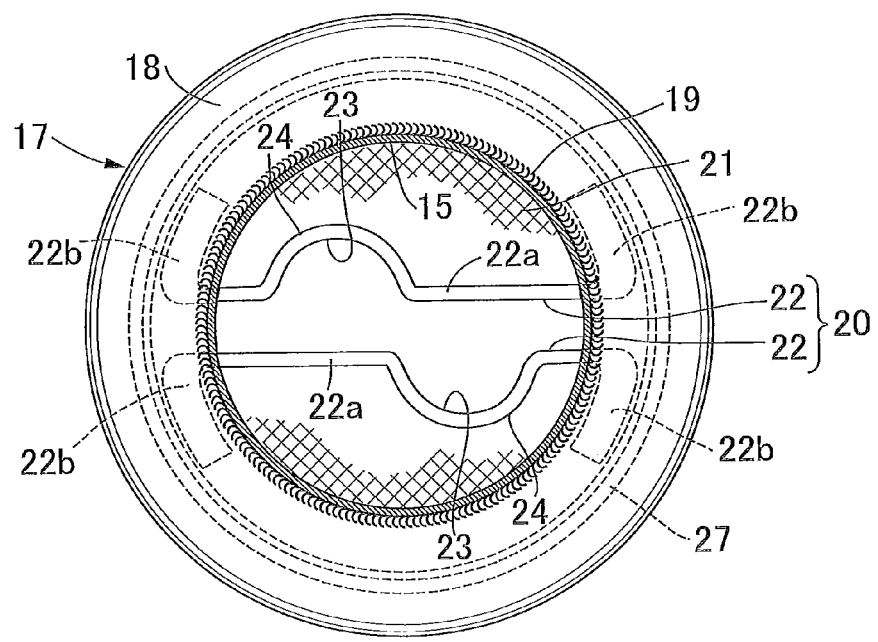
FIG. 6 is a sectional view along line 6-6 in FIG. 5. (second embodiment)

A second embodiment of the present invention shown in FIG. 5 and FIG. 6 is now explained.

In this second embodiment, a pair of support pieces 22b and 22b are formed at opposite ends of each of two band plate members 22 and 22 forming a gun stopper 20, and projections 24 and 24 of each of the band plate members 22 and 22 are offset from each other in opposite directions from the axis of a fuel filler guide tube 15; these two band plate members 22 and 22 are spaced from each other, and the pair of support pieces 22b and 22b of each of the band plate members 22 and 22 are welded to a lower face of a mounting plate 18. Since the arrangement is otherwise the same as the preceding embodiment, parts in FIG. 5 and FIG. 6 corresponding to those of the preceding embodiment are denoted by the same reference numerals and symbols, and duplication of the explanation is omitted.

In accordance with the second embodiment, the number of support pieces 22b of the band plate members 22 and 22 forming the gun stopper 20 increases compared with the preceding embodiment, but an abutment region of the gun stopper 20 against a fuel filler gun G can be widened.

Embodiment 3

Figure 7:
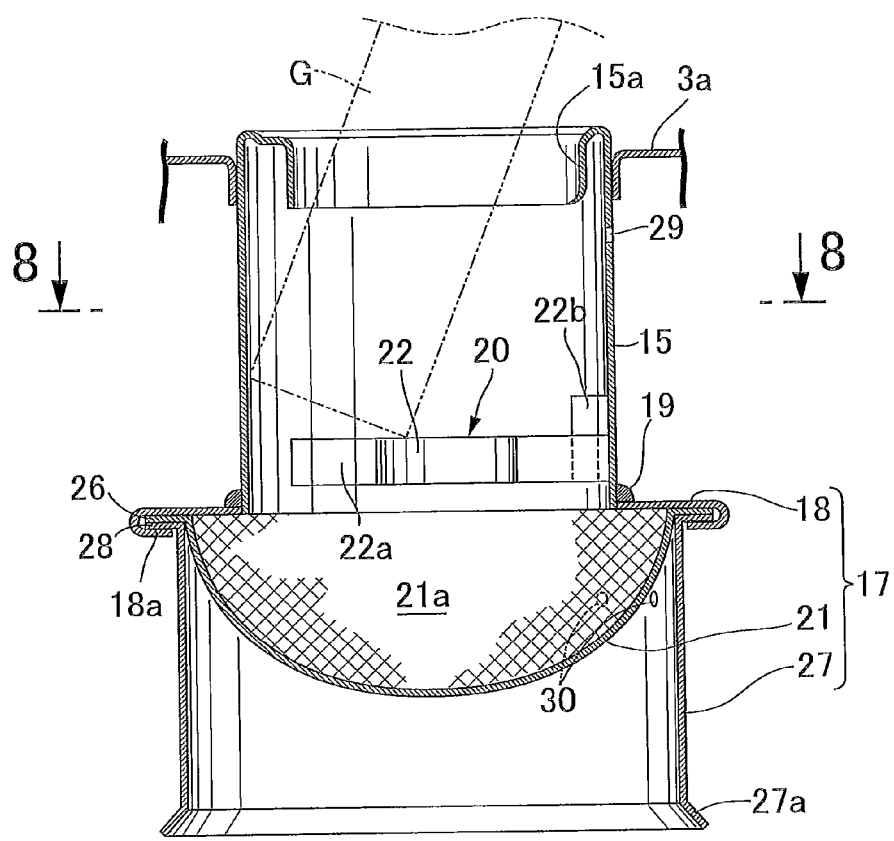
FIG. 7 is a view, corresponding to FIG. 3, showing a third embodiment of the present invention. (third embodiment)
Figure 8:
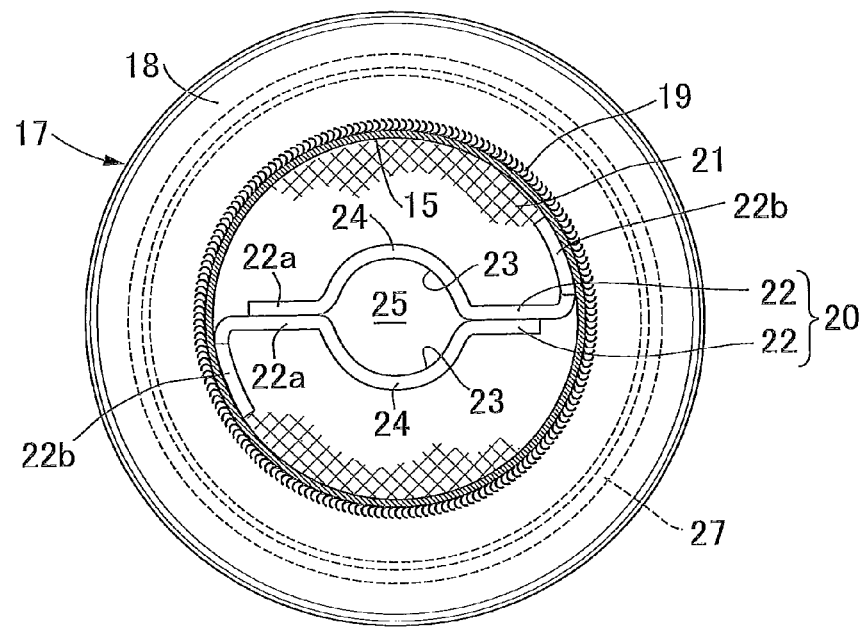
FIG. 8 is a sectional view along line 8-8 in FIG. 7. (third embodiment)

A third embodiment of the present invention shown in FIG. 7 and FIG. 8 is an arrangement in which a pair of support pieces 22b and 22b of two band plate members 22 and 22 forming a gun stopper 20 as in the first embodiment are formed so as to follow the inner peripheral face of a fuel filler guide tube 15, and are secured by welding to the inner peripheral face of a lower part of the fuel filler guide tube 15. Since the arrangement is otherwise the same as the first embodiment, parts in FIG. 7 and FIG. 8 corresponding to those of the first embodiment are denoted by the same reference numerals and symbols, and duplication of the explanation is omitted.

In the case of the third embodiment, a flame arrestor assembly 17 is formed from three components, that is, a mounting plate 18, a flame arrestor 21, and a skirt 27.

Embodiment 4

Figure 9:
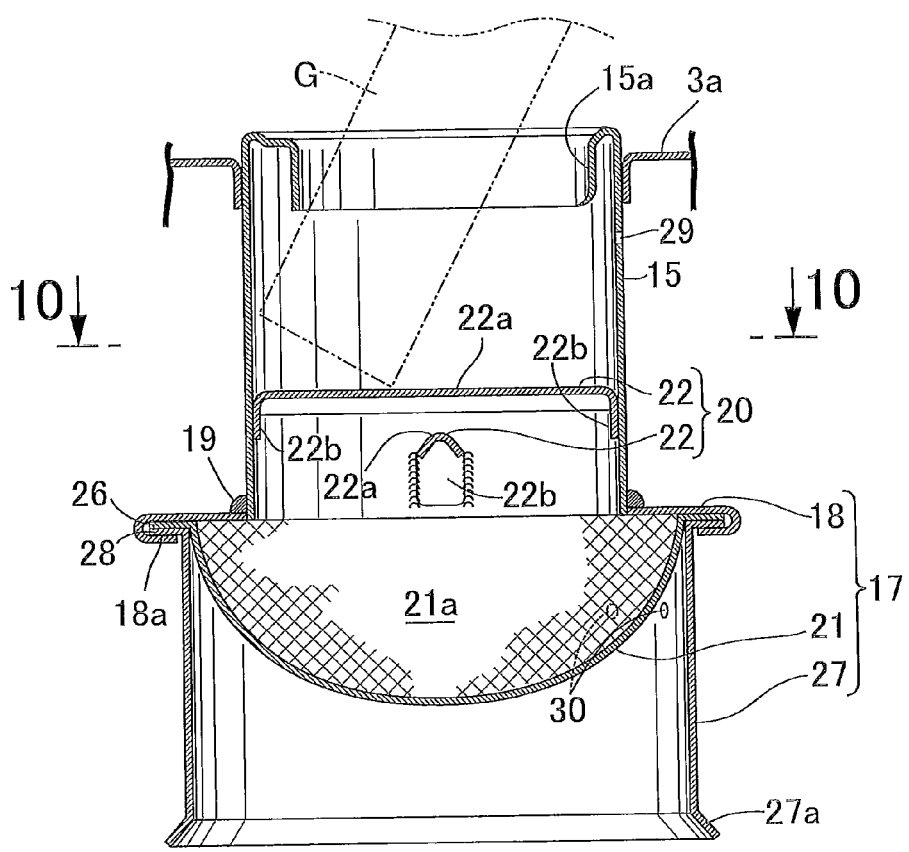
FIG. 9 is a view, corresponding to FIG. 3, showing a fourth embodiment of the present invention. (fourth embodiment)
Figure 10:
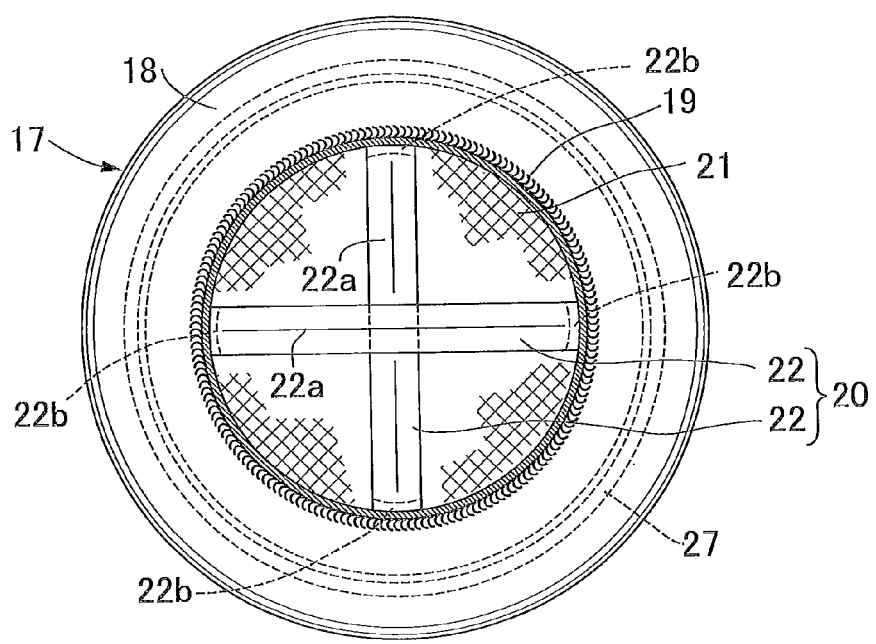
FIG. 10 is a sectional view along line 10-10 in FIG. 9. (fourth embodiment)

A fourth embodiment of the present invention shown in FIG. 9 and FIG. 10 is now explained.

In this fourth embodiment, provided on each of two band plate members 22 and 22 forming a gun stopper 20 are a main portion 22a having an upwardly convex inverted V-shaped cross-section and a pair of flat, plate-form support pieces 22b and 22b bending downward from opposite ends of the main portion 22a; these two band plate members 22 and 22 are mounted so that the main portions 22a are disposed so as to intersect each other in a cross shape when viewed from above a fuel filler guide tube 15, and the support pieces 22b and 22b are welded to the inner peripheral face of a lower part of the fuel filler guide tube 15. Since the arrangement apart from the gun stopper 20 is the same as the first embodiment, parts in FIG. 9 and FIG. 10 corresponding to those of the first embodiment are denoted by the same reference numerals and symbols, and duplication of the explanation is omitted.

In accordance with this fourth embodiment, since the two band plate members 22 and 22 forming the gun stopper 20 are disposed so that when viewed from above they intersect each other in a cross shape within the fuel filler guide tube 15, it is possible to widen an abutment region of the gun stopper 20 against a fuel filler gun G. Moreover, since the main portion 22a, traversing the interior of the fuel filler guide tube 15, of each of the band plate members 22 and 22 is given an upwardly convex inverted V-shaped cross-section, it is possible to increase the flexural strength of each of the band plate members 22 and 22, make fuel that has flowed into the fuel filler guide tube 15 flow down smoothly along opposite inclined outside faces of each of the band plate members 22 and 22, and reduce the fuel flow resistance, thus speeding filling with fuel.

Embodiment 5

Figure 11:
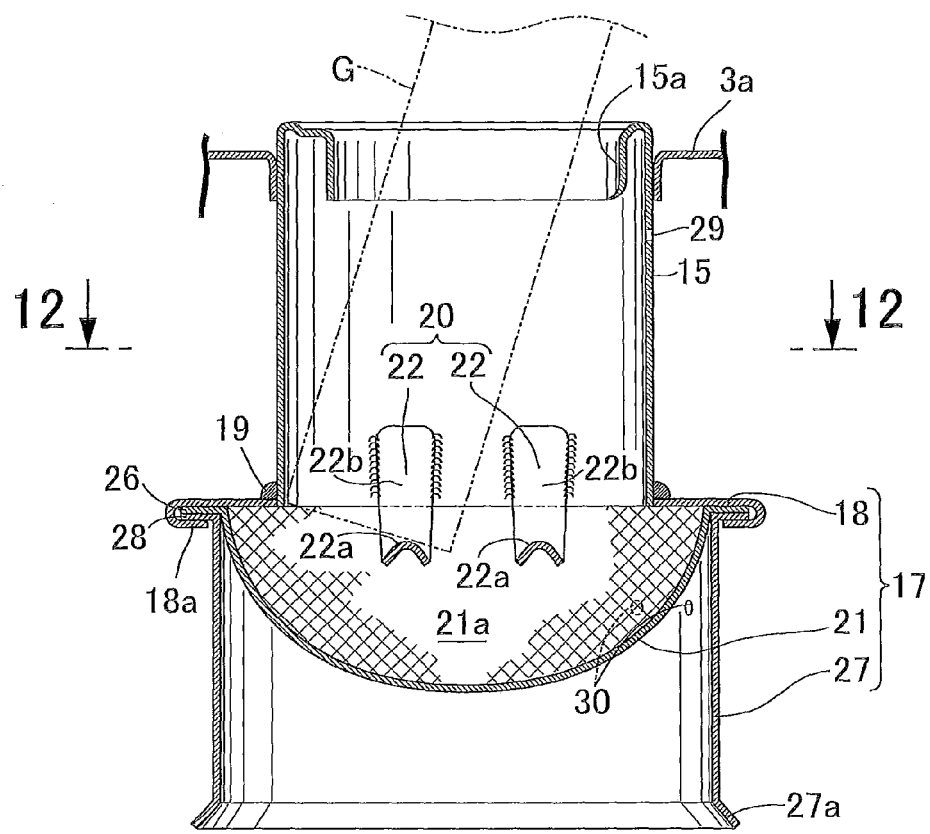
FIG. 11 is a view, corresponding to FIG. 3, showing a fifth embodiment of the present invention. (fifth embodiment)
Figure 12:
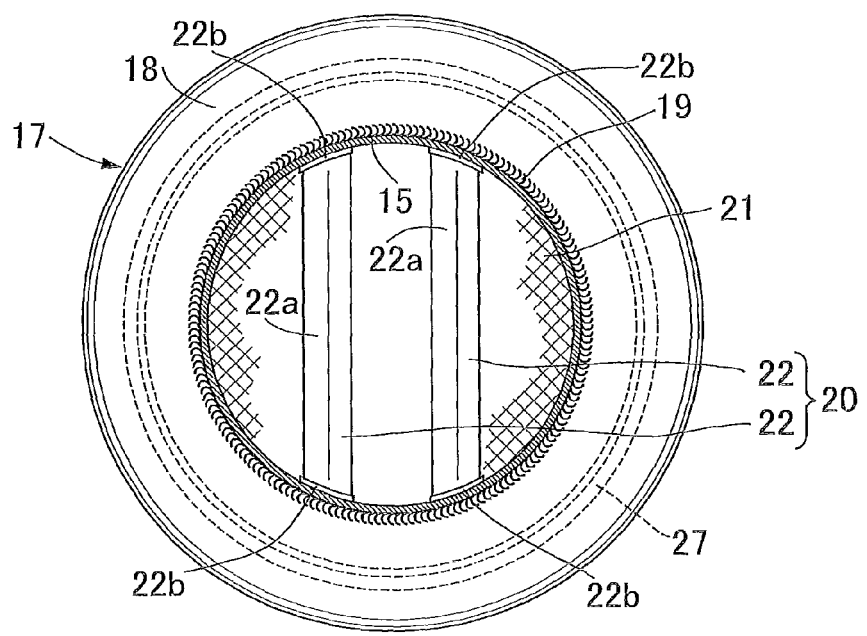
FIG. 12 is a sectional view along line 12-12 in FIG. 11. (fifth embodiment)

A fifth embodiment of the present invention shown in FIG. 11 and FIG. 12 is now explained.

In this fifth embodiment, provided on each of two band plate members 22 and 22 forming a gun stopper 20 are a main portion 22a having an upwardly convex inverted V-shaped cross-section and a pair of flat, plate-form support pieces 22b and 22b bending upward from opposite ends of the main portion 22a; these two band plate members 22 and 22 are mounted so that the main portions 22a are disposed in a hollow portion 21a of a flame arrestor 21 parallel to each other with a constant spacing, and the support pieces 22b and 22b are welded to the inner peripheral face of a lower part of a fuel filler guide tube 15. Since the arrangement apart from the gun stopper 20 is the same as the first embodiment, parts in FIG. 9 and FIG. 10 corresponding to those of the first embodiment are denoted by the same reference numerals and symbols, and duplication of the explanation is omitted.

In accordance with the fifth embodiment, in addition to the same operational effects as in the fourth embodiment being achieved, since the main portion 22a of each of the band plate members 22 and 22 is disposed in the hollow portion 21a of the flame arrestor 21, which has a larger diameter than that of the fuel filler guide tube 15, it is possible to suppress the reduction in flow path area of the fuel filler guide tube 15 due to the gun stopper 20, and decrease the overall fuel flow resistance.

Embodiment 6

Figure 13:
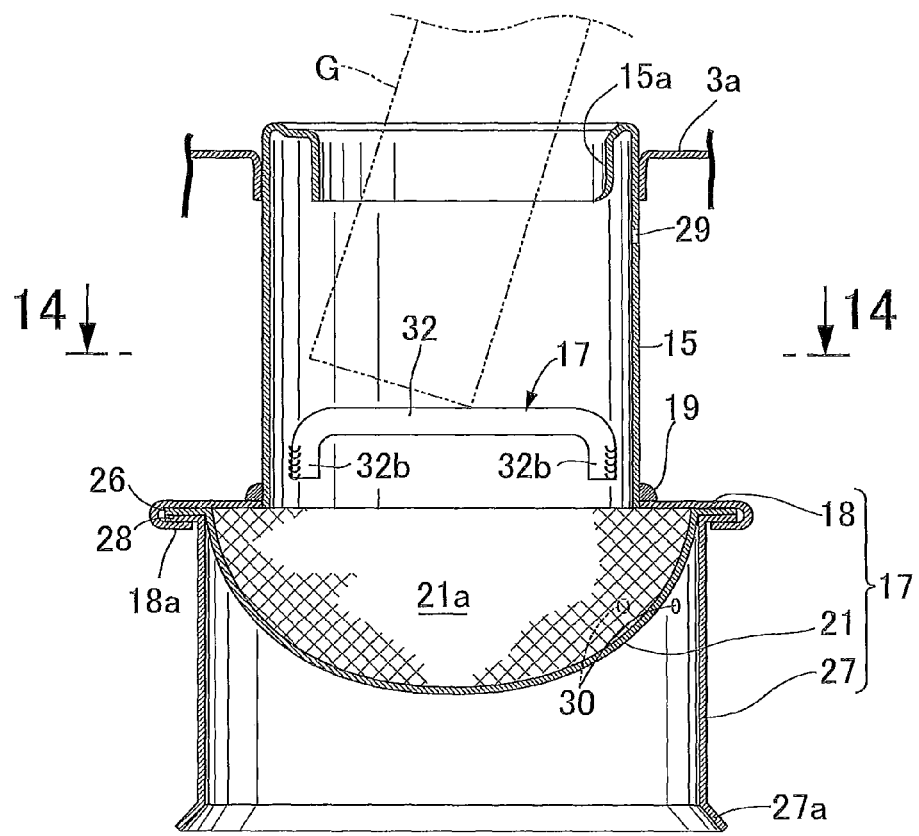
FIG. 13 is a view, corresponding to FIG. 3, showing a sixth embodiment of the present invention. (sixth embodiment)
Figure 14:
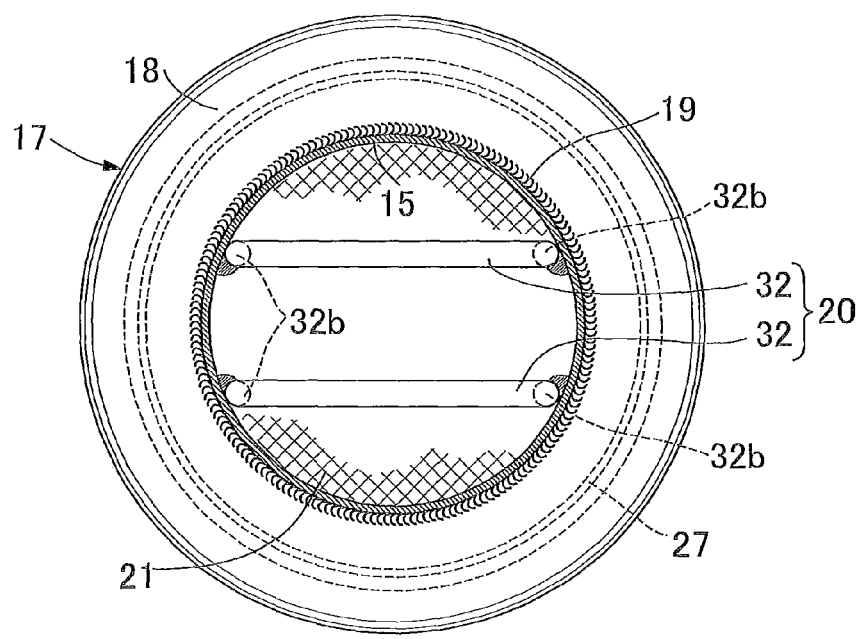
FIG. 14 is a sectional view along line 14-14 in FIG. 13. (sixth embodiment)

A sixth embodiment of the present invention shown in FIG. 13 and FIG. 14 is now explained.

In this sixth embodiment, a gun stopper 20 is formed from two round bar members 32 and 32; these round bar members 32 and 32 are disposed so as to traverse a lower part of the interior of a fuel filler guide tube 15 while being arranged parallel to each other with a constant spacing, and support pieces 32a, 32a; 32a, 32a formed by bending downward or upward opposite end parts of each of the round bar members 32 and 32 are mounted by welding to the inner peripheral face of a lower part of the fuel filler guide tube 15. Since the arrangement apart from the gun stopper 20 is the same as the first embodiment, parts in FIG. 13 and FIG. 14 corresponding to those of the first embodiment are denoted by the same reference numerals and symbols, and duplication of the explanation is omitted.

In accordance with this sixth embodiment, since the round bar members 32 and 32 have a circular cross-section, the flexural strength is high, and fuel that has flowed into the fuel filler guide tube 15 can be made to flow down along a smooth cylindrical face of the round bar members 32 and 32, thus reducing the fuel flow resistance and thereby speeding filling with fuel.

Embodiment 7

Figure 15:
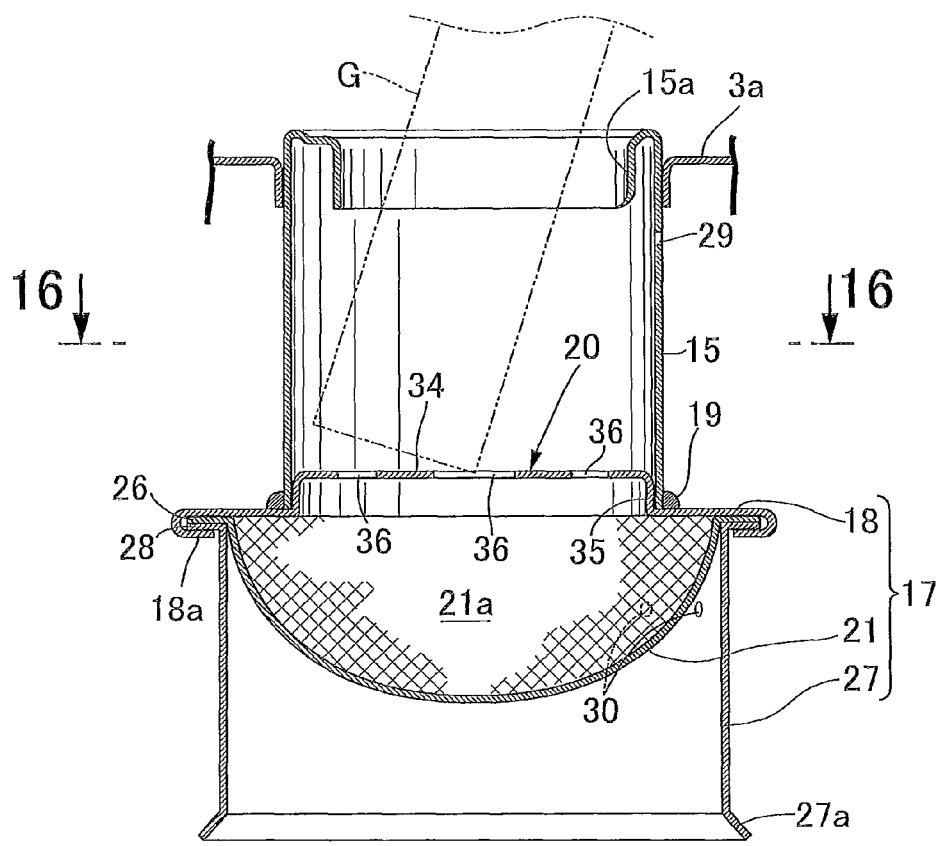
FIG. 15 is a view, corresponding to FIG. 3, showing a seventh embodiment of the present invention. (seventh embodiment)
Figure 16:
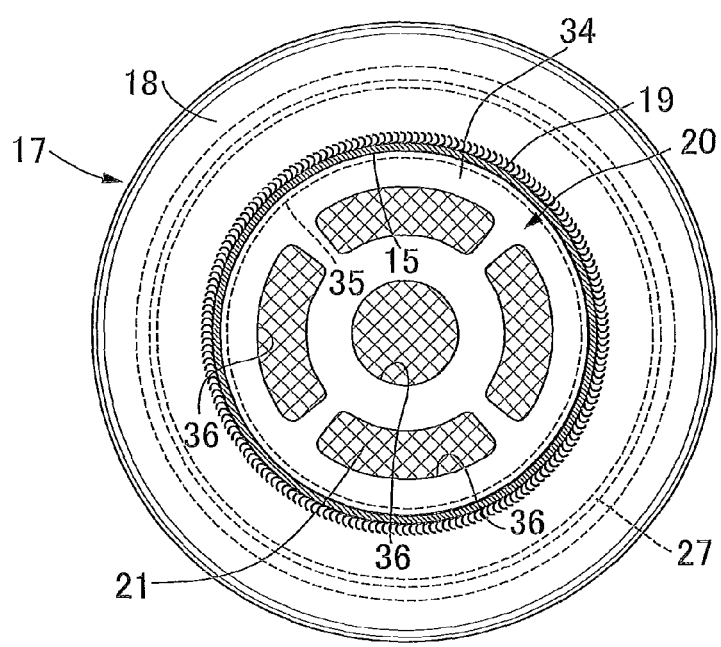
FIG. 16 is a sectional view along line 16-16 in FIG. 15. (seventh embodiment)

A seventh embodiment of the present invention shown in FIG. 15 and FIG. 16 is now explained.

In this seventh embodiment, a gun stopper 20 formed from a disk portion 34 and an annular wall part 35 bending downward from the outer peripheral edge of the disk portion 34 is provided in a mounting plate 18 of a flame arrestor assembly 17 so as to be connected to and integral with the mounting plate 18, and a large number of through holes 36 allowing the passage of fuel flowing into a fuel filler guide tube 15 are bored in the disk portion 34. The annular wall part 35 is fitted into the inner peripheral face of a lower end part of the fuel filler guide tube 15. Since the arrangement apart from the gun stopper 20 is the same as the first embodiment, parts in FIG. 15 and FIG. 16 corresponding to those of the first embodiment are denoted by the same reference numerals and symbols, and duplication of the explanation is omitted.

In accordance with this seventh embodiment, a special step for mounting the gun stopper 20 on the mounting plate 18 is naturally eliminated due to integration of the mounting plate 18 of the flame arrestor assembly 17 and the gun stopper 20. Moreover, since the annular wall part 35 of the gun stopper 20 is fitted into the inner peripheral face of the lower end part of the fuel filler guide tube 15, the coaxial precision between the fuel filler guide tube 15 and the flame arrestor assembly 17 can easily be enhanced. Moreover, the annular wall part 35 contributes to an increase in the rigidity of the gun stopper 20, and not only can deformation thereof due to an abutment impact from the fuel filler gun G be prevented, but also the occurrence of distortion of a weld 19 between the fuel filler guide tube 15 and the mounting plate 18 due to the deformation can be prevented, thus contributing to an improvement in the durability of the weld 19.

Embodiment 8

Figure 17:
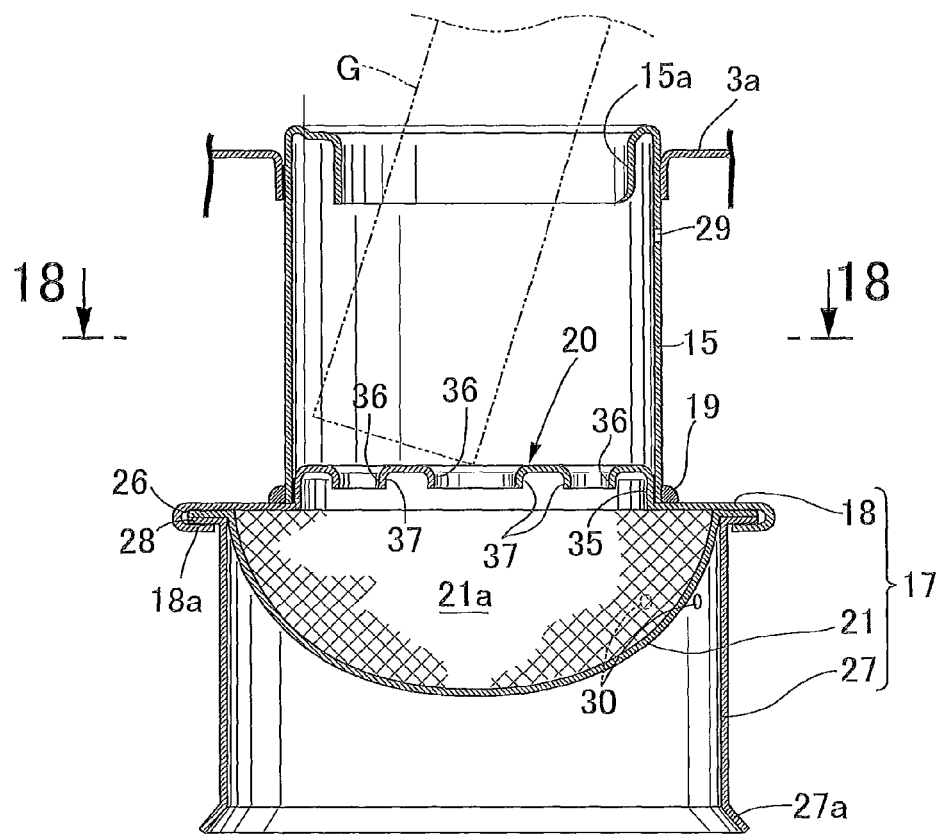
FIG. 17 is a view, corresponding to FIG. 15, showing an eighth embodiment of the present invention. (eighth embodiment)
Figure 18:
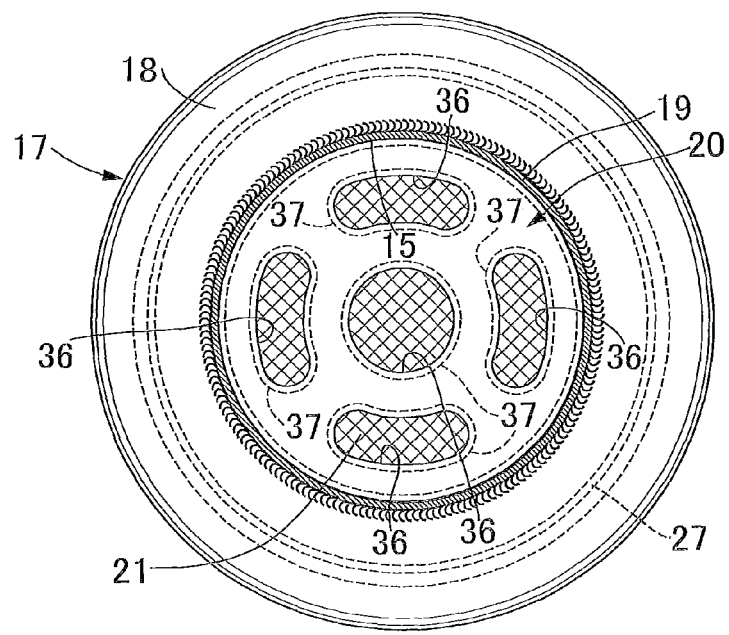
FIG. 18 is a sectional view along line 18-18 in FIG. 17. (eighth embodiment)

An eighth embodiment of the present invention shown in FIG. 17 and FIG. 18 is an arrangement in which a large number of annular ribs 37 are formed on the gun stopper 20 in the seventh embodiment so as to project downward from the peripheral edge of the large number of through holes 36; parts in FIG. 17 and FIG. 18 corresponding to those of the seventh embodiment are denoted by the same reference numerals and symbols, and duplication of the explanation is omitted.

In accordance with this eighth embodiment, the annular ribs 37 on the peripheral edge of the through holes 36 enhance the rigidity of the disk-shaped gun stopper 20, and smoothly guide downward flow of fuel passing through the through holes 36.

Embodiment 9

Figure 19:
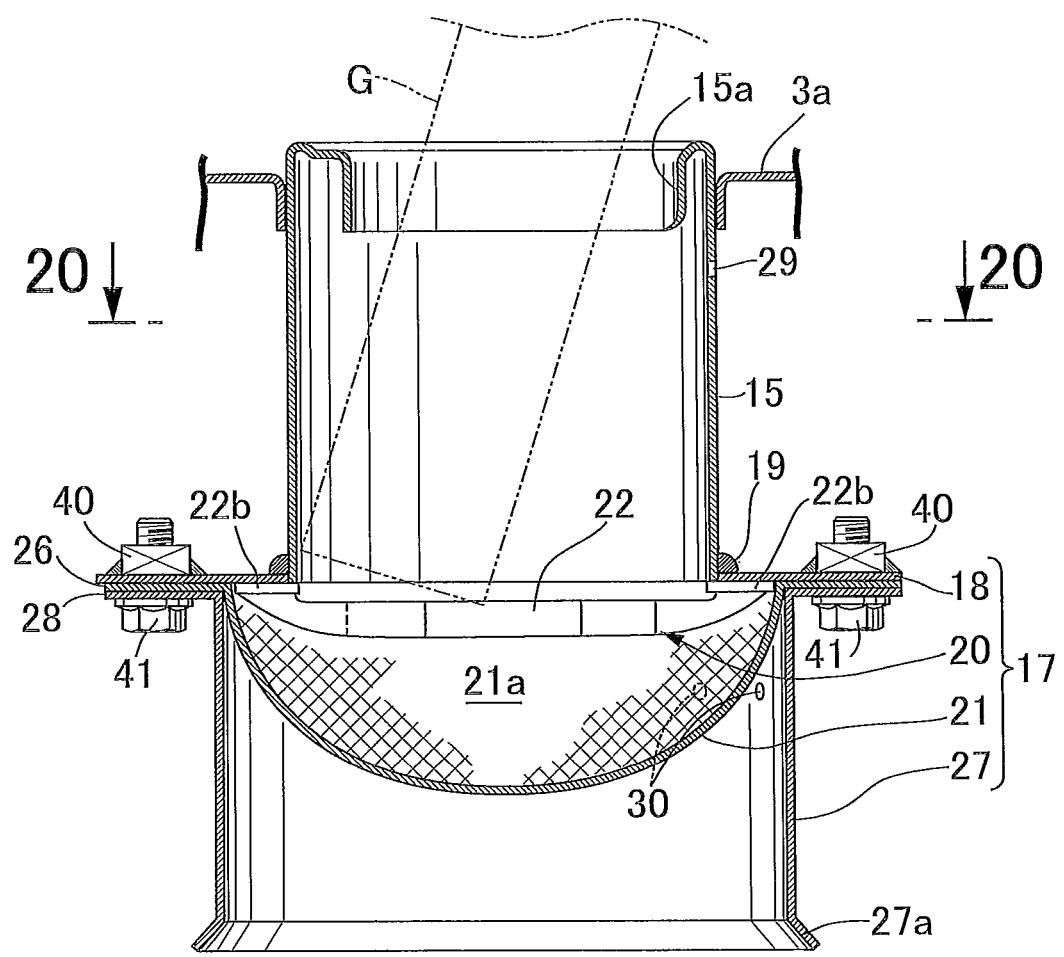
FIG. 19 is a view, corresponding to FIG. 3, showing a ninth embodiment of the present invention. (ninth embodiment)
Figure 20:
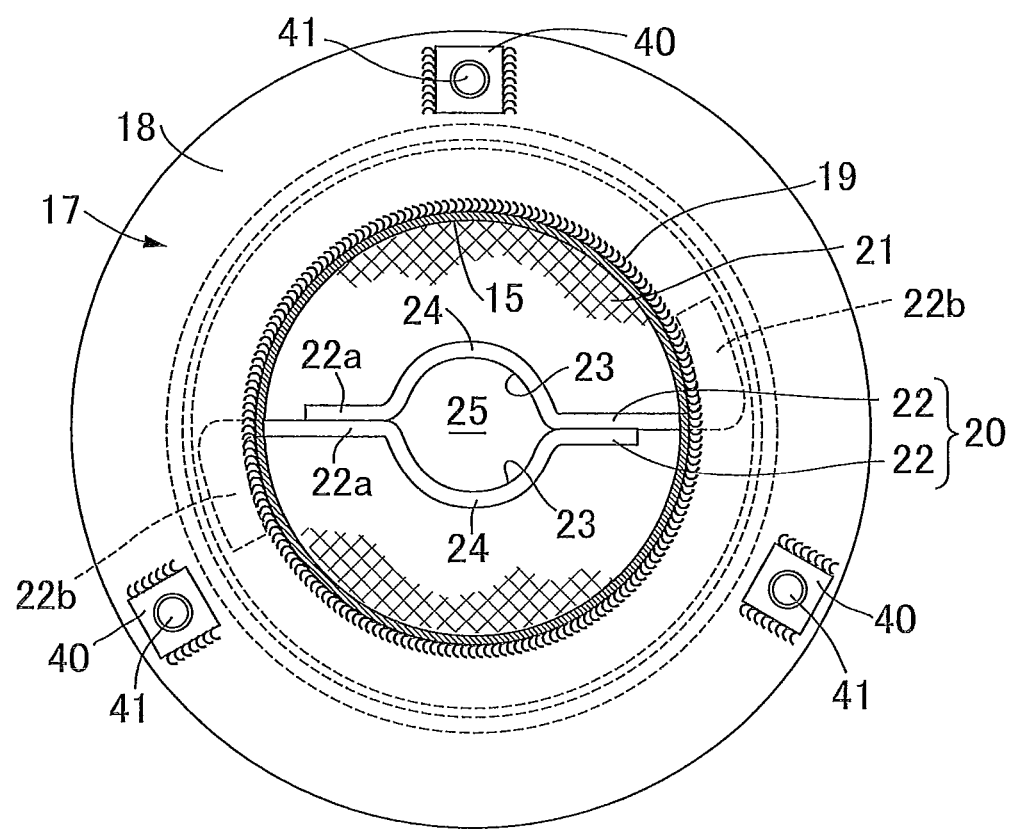
FIG. 20 is a sectional view along line 20-20 in FIG. 19. (ninth embodiment)

A ninth embodiment of the present invention shown in FIG. 19 and FIG. 20 is now explained.

In accordance with this ninth embodiment, instead of swaging when forming the flame arrestor assembly 17 of each of the above embodiments, three components, that is, a mounting plate 18, a flange 26 of a flame arrestor 21, and a flange 28 of a skirt 27, are joined by means of a plurality of weld nuts 40 and bolts 41. In this case, a gun stopper 20 is mounted on, for example, a lower face of the mounting plate 18 as in the first embodiment of FIG. 3. Since the arrangement is otherwise the same as the first embodiment, parts in FIG. 19 and FIG. 20 corresponding to those of the first embodiment are denoted by the same reference numerals and symbols, and duplication of the explanation is omitted.

Embodiment 10

Figure 21:
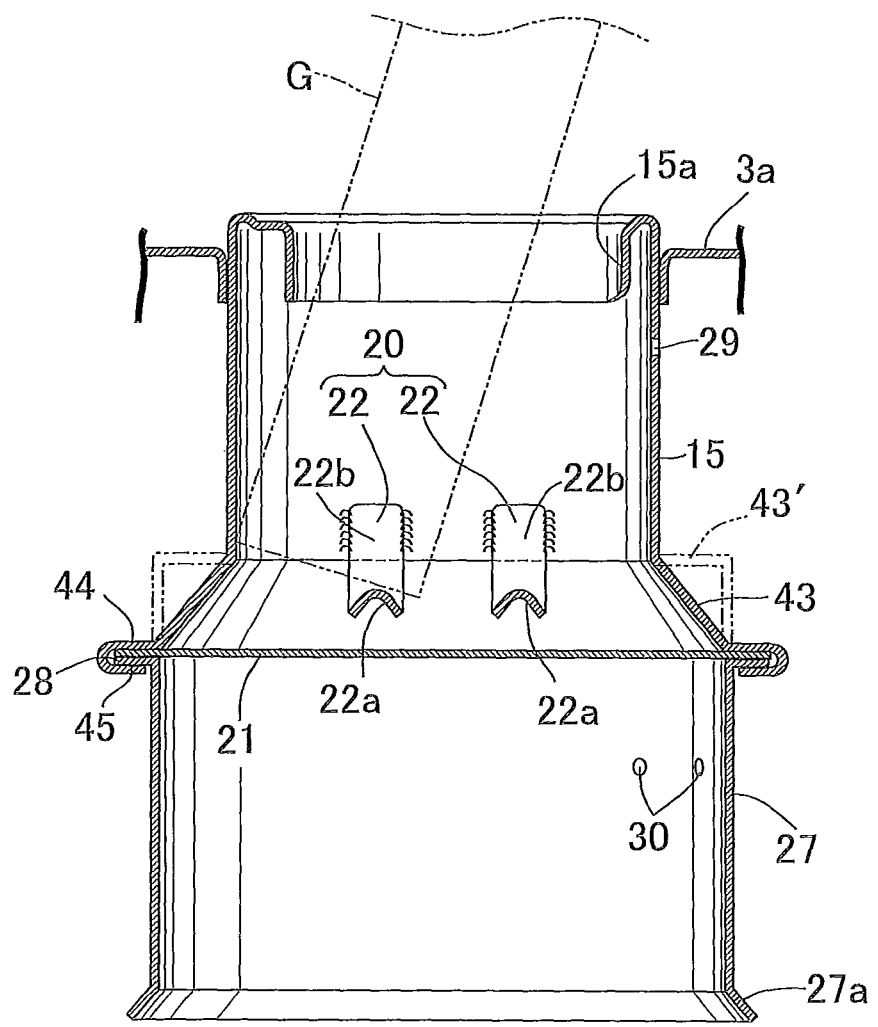
FIG. 21 is a view, corresponding to FIG. 11, showing a tenth embodiment of the present invention. (tenth embodiment)

Finally, a tenth embodiment of the present invention shown in FIG. 21 is explained.

In this tenth embodiment, provided so as to be connected to the lower end of a fuel filler guide tube 15 is a tapered portion 43 that increases in diameter as it goes downward or a large-diameter cylindrical part 43' having a larger diameter than that of the fuel filler guide tube 15. Provided in each of two band plate members 22 and 22 forming a gun stopper 20 as in the fifth embodiment of FIG. 11 and FIG. 12 are a main portion 22a having an upwardly convex inverted V-shaped cross-section and a pair of flat, plate-form support pieces 22b and 22b bending upward from opposite ends of the main portion 22a; these two band plate members 22 and 22 are disposed in the tapered part 43 or the large-diameter cylindrical part 43' so that the main portions 22a are parallel to each other with a constant spacing, and the support pieces 22b and 22b are welded to the inner peripheral face of a lower part of the fuel filler guide tube 15.

A mounting flange 44 and a swaging part 45 connected to the outer peripheral end thereof are provided integrally with the lower end of the tapered part 43 or the large-diameter cylindrical part 43'; by superimposing in sequence on a lower face of the mounting flange 44 a flat, plate-form flame metal mesh arrestor 21 and a flange 28 at the upper end of a skirt 27, and swaging the swaging part 45, the flame arrestor 21 and the skirt 27 are joined to the tapered part 43 or the large-diameter cylindrical part 43'.

In accordance with this tenth embodiment, providing the tapered part 43 or the large-diameter cylindrical part 43' so as to be connected to the lower end of the fuel filler guide tube 15 enables the flat, plate-form flame arrestor 21 having a larger diameter than that of the fuel filler guide tube 15 to be used, thus reducing the fuel flow resistance of the flame arrestor 21. Moreover, since the main portion 22a of each of the band plate members 22 and 22 of the flame arrestor 21 is disposed within the tapered part 43 or the large-diameter cylindrical part 43', which is wider than the interior of the fuel filler guide tube 15, it is possible to suppress any decrease in the flow path area of the fuel filler guide tube 15 due to the gun stopper 20, thus reducing the overall fuel flow resistance.

Embodiments of the present invention are explained above, but the present invention is not limited to the above-mentioned embodiments, and may be modified in a variety of ways as long as the modifications do not depart from the spirit and scope of the present invention. For example, the number of band plate members 22 or round bar members 32 forming the gun stopper 20 is not limited to two, and may be selected appropriately according to the size of the fuel filler guide tube 15.

The invention claimed is:

1. A vehicular fuel tank fuel filler orifice device provided with a fuel filler orifice in an upper wall of a vehicular fuel tank for storing ethanol fuel as fuel for an engine comprising:
   a fuel filler guide tube extending from the fuel filler orifice to a distal end extending within an interior of the fuel tank, said fuel filler guide tube having a predetermined diameter;
   a mounting plate secured on the distal end of the fuel filler guide tube and extending outwardly beyond the predetermined diameter of the fuel filler guide tube;

a flame arrestor being secured to the mounting plate and having a predetermined diameter larger than the predetermined diameter of the fuel filler guide tube, said flame arrestor being made of a metal mesh and covering a lower opening of the fuel filler guide tube for allowing a flow of the fuel but preventing the entrance of flame, said flame arrestor being formed into a bowl shape having a depth that is smaller relative to the predetermined diameter of the flame arrestor; and a skirt having a proximal end secured to the mounting plate and a distal end extending within the interior of the fuel tank, said flame arrestor being secured to the mounting plate with the skirt extending downwardly to surround at least a portion of the flame arrestor;

said mounting plate being connected to the distal end of the fuel filler guide tube, the mounting plate having a larger diameter than that of the fuel filler guide tube, and an outer peripheral end part of the flame arrestor is mounted on an outer peripheral end part of the mounting plate, the flame arrestor having a bowl shape with an open upper face.

2. The vehicular fuel tank fuel filler orifice device according to claim 1, wherein a gun stopper preventing abutment of a fuel filler gun inserted into the fuel filler guide tube against the flame arrestor is provided on the mounting plate.

3. The vehicular fuel tank fuel filler orifice device according to claim 1, wherein the flame arrestor is constructed of a zinc-plate metal mesh.

4. The vehicular fuel tank fuel filler orifice device according to claim 1, wherein the flame arrestor is constructed of wires having a diameter of approximately 0.28 mm with a number of mesh per square inch being 16.

5. The vehicular fuel tank fuel filler orifice device according to claim 1, wherein said flame arrestor includes a flange on an outer peripheral surface thereof and said skirt includes a flange on the proximal end thereof, said flange of said flame arrestor and the flange of the skirt being superimposed one on the other and secured to a lower surface of the mounting plate.

6. The vehicular fuel tank fuel filler orifice device according to claim 5, wherein the mounting plate includes a swaging part formed by bending an outer peripheral part of the mounting plate downwardly and radially inwardly with the flange of the flame arrestor and the flange of the skirt being held between the swaging part and the lower surface of the mounting plate.

7. The vehicular fuel tank fuel filler orifice device according to claim 1, and further including a vent formed in an upper portion of the fuel filler guide tube for providing communication between the interior of the fuel tank and the atmosphere.

8. The vehicular fuel tank fuel filler orifice device according to claim 7, and further including a vent formed in the skirt for providing communication between the interior of the fuel tank and the atmosphere.

9. The vehicular fuel tank fuel filler orifice device according to claim 8, wherein a diameter of the vent in the skirt is larger relative to a diameter of the vent in the fuel filler guide.

10. The vehicular fuel tank fuel filler orifice device according to claim 1, wherein the skirt prevents air convection between the interior of the fuel filler guide tube and an upper portion of the interior of the fuel tank for occurring via the flame arrestor.

11. The vehicular fuel tank fuel filler orifice device according to claim 1, wherein the larger predetermined diameter of the flame arrestor relative to the predetermined diameter of the fuel filler guide tube ensures a fuel flow area for displacement of air within the fuel tank.

12. The vehicular fuel tank fuel filler orifice device according to claim 2, wherein the gun stopper is positioned within a hollow portion of the flame arrestor for suppressing any reduction in a flow path area of the fuel filler guide tube to decrease overall fuel flow resistance and for facilitating the filling of the fuel tank.

13. The vehicular fuel tank fuel filler orifice device according to claim 2, wherein the gun stopper is formed of two band plate members having a plate face parallel to each other and including a projection formed by bending each of the two band plate members for strengthening the gun stopper and for providing an aperture for the flow of fuel into the fuel tank.

14. The vehicular fuel tank fuel filler orifice device according to claim 2, wherein the gun stopper is secured to an interior portion of the fuel filler guide tube at a position displaced upwardly relative to a positioning of the flame arrestor.

* * * * *